W. STANLEY.
SYSTEM FOR GENERATING ALTERNATING CURRENTS.
APPLICATION FILED MAY 13, 1905. RENEWED MAY 5, 1909.
925,607.
Patented June 22, 1909.
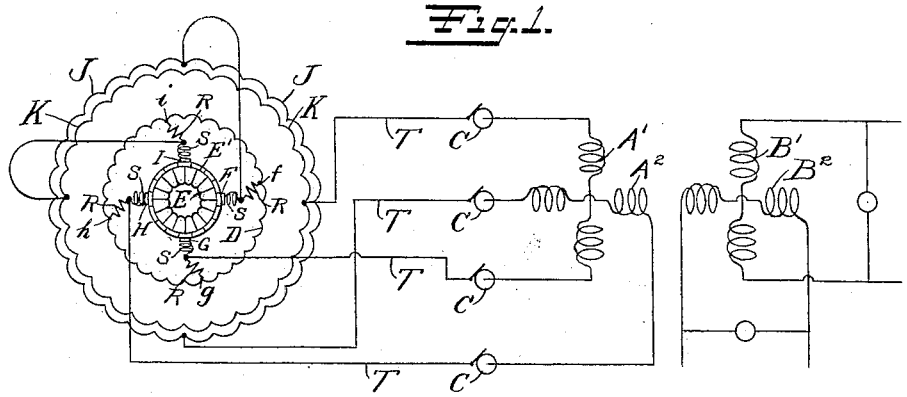
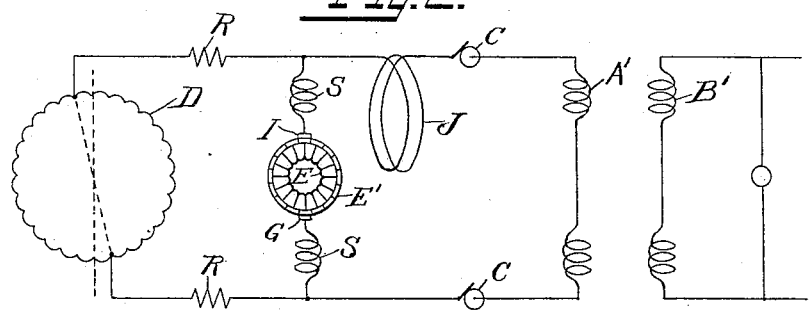
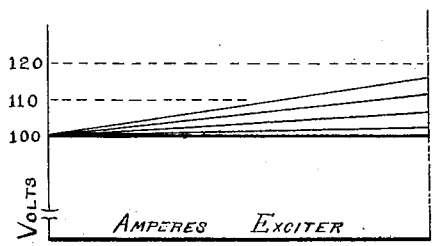
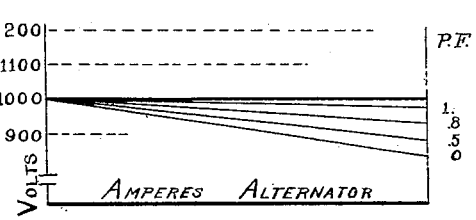
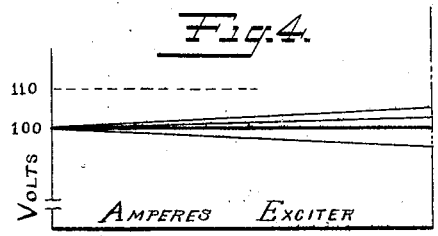
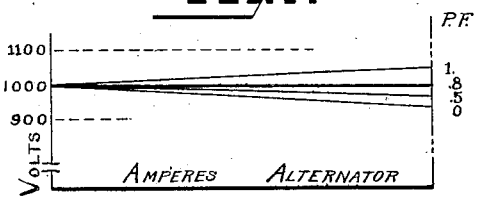
Witnesses
William Stanley Inventor
By his Attorneys

UNITED STATES PATENT OFFICE.

WILLIAM STANLEY, OF GREAT BARRINGTON, MASSACHUSETTS, ASSIGNOR TO GENERAL ELECTRIC COMPANY, A CORPORATION OF NEW YORK.

SYSTEM FOR GENERATING ALTERNATING CURRENTS.

No. 925,607.　　　Specification of Letters Patent.　　　Patented June 22, 1909.

Application filed May 13, 1905, Serial No. 260,250. Renewed May 5, 1909. Serial No. 494,134.

*To all whom it may concern:*

Be it known that I, WILLIAM STANLEY, a citizen of the United States, residing at Great Barrington, county of Berkshire, Massachusetts, have invented certain new and useful Improvements in Systems for Generating Alternating Currents, of which the following is a full, clear, and exact description.

My invention relates to systems for generating alternating currents and controlling the potential gradient of the current generated by means of automatic reactions taking place in the apparatus and system through variations of load. By potential gradient I mean variation of electro-motive force under varying conditions. Thus, a positive potential gradient exists when the potential rises as the load increases, and a negative potential gradient is present when the potential falls as the load increases.

The system involves the use of a main dynamo electric machine, one element of which is excited by alternating currents of low frequency while either it or the other element is revolved at such a speed as to induce in its windings electro-motive forces of the desired frequency. Such machines have heretofore been operated, the energizing windings being supplied with currents of constant potential, and their construction is described in United States Letters Patent Nos. 712,613, 712,614 granted to myself and John F. Kelly the 4th day of November, 1902. It has, however, been found by experience that when energized by such constant potential currents, these machines when delivering currents of any power factor have a negative or falling potential gradient when the speed of rotation of the rotor is below synchronism, that is, when the speed of rotation of the rotor plus the speed of rotation of the magnetizing field corresponds to the frequency of the induced currents. This is indicated in Figure 3ª hereinafter referred to. It has further been found by experience that these machines when running above synchronism and energized by constant potential currents have a rising potential gradient when delivering unity power factor currents, and that with a lagging current the potential gradient gradually changes until with low power factors it becomes a falling potential gradient. At some point, such as power factor .8, the potential gradient is zero (potential constant). This is indicated in Fig. 4ª hereinafter referred to. Thus, considering the rotor as the field structure, and the stator as the induced element, as described in the patents above named, if the rotor is mechanically rotated in the same direction as the direction of magnetic rotation of the field impressed upon the stator, electro-motive forces will be developed in the stator circuits capable of supplying a current to the exterior or working lines. If such currents flow from the stator to the external circuit, and are, for instance, of unity power factor, they will generate additional electro-motive forces within the rotor circuit of the machine, and therefore produce in the exciting circuits new or superimposed currents substantially opposite in phase to those in the stator of the machine. The exciter will therefore be called upon to furnish not only the original magnetizing currents to produce the rotating magnetic field, above described, in the rotor, but with an increase of load a corresponding increase of current in the magnetizing circuit.

Considering the circuits of the alternator, there will be load current in the stator circuits, and superimposed current in the rotor circuits, and these two currents will be very nearly but not quite 180° apart and will consequently nearly neutralize each other's magneto-motive forces, and thus destroy the usual armature reaction found in alternate current dynamos. This neutralization of these two fields would be entirely complete and effective if the rotor and stator circuits possessed infinitely small resistance and no magnetic leakage, but as such a condition is not obtainable, there is a small resulting magneto-motive force due to the resultant magneto-motive forces of these two currents which tends to decrease the magnetism made by the original exciting current. The electro-motive force of the alternator therefore drops slightly with an increase in load of unity power factor current. This decrease of the potential of the alternator when excited at constant potential is therefore due to the resistance of the rotor circuit. In like manner, it can be shown that the potential gradient of the machine when excited at constant potential is negative when the machine is delivering lagging currents because of the magnetic leakage or lack of perfect mutual induction between the stator and rotor windings. The potential gradient of such a machine when excited at constant potential differs in each individual machine with differences of resistances and magnetic leakage about its circuits. If now, the field structure of the alternator be rotated in the opposite direction so that the magnetic rotation of the field impressed upon the stator is opposite to the physical rotation of the rotor, resulting in the production of a generated frequency due to the difference of the rotational frequency and the impressed frequency of excitation, the potential of the machine when excited by constant potential currents differs from that before referred to. In this case, the effect of the magnetic leakage about the circuits is to produce the same decrease in potential with increase of lagging current load above described, but the effect of the resistance of the rotor circuit is to make the resulting magneto-motive force of the stator and the superimposed rotor currents assist the magnetization of the machine, and therefore to increase its electro-motive force with increase of load when delivering power factor unity currents. In this case, therefore, the potential gradient of the alternator when excited at constant potential is rising or positive when delivering power factor unity currents and is substantially zero at some lower power factor, such for instance, as .8, and falling or negative when delivering power factor zero currents to the line.

The potential gradient of the alternator with constant potential excitation I term the normal potential gradient. In order to maintain the terminal potential of the alternator constant through all variations of volume, and phase of current delivered to the external circuit, it is therefore necessary that the potential gradient of the exciter be complementary to the normal potential gradient of the alternator. Thus, if the potential of the alternator tends to fall 10%, the potential of the exciter should under the conditions present rise 10%. If the potential of the alternator tends to rise 10% the potential of the exciter should under such conditions fall 10%, thus counteracting any tendency to change the alternator electro-motive force.

The object of my invention is to automatically secure this complementary variation of the potential of the exciter, the same being brought about by the reaction of the alternator itself. These variations of current from the exciter circuit (called by me the "superimposed" rotor current) are due to the current delivered from the alternator to the external circuit. The invention is based upon the automatic variation of the exciter electro-motive force, which is complementary so as to be opposite in direction to the variation of the potential of the generator.

In carrying out my invention I preferably use as an exciter the dynamo electric machine described in my application, Serial No. 260,248, filed concurrently herewith; one embodiment of which is shown as incorporated in my present system, which I will now more fully explain, reference being had to the accompanying drawings, in which—

Fig. 1 represents a system embodying my invention. Fig. 2 is a simplified diagram of the same. Figs. 3 and 3ᵃ and 4 and 4ᵃ are diagrams of potential gradients for indicated power factors of alternator currents.

Referring more particularly to the drawings, $A'$ $A^2$ represent the multiphase windings of the field structure of the alternator described in Letters Patent Nos. 712,613 and 712,614, granted to myself and John F. Kelly on the 4th day of November, 1902.

$B'$ $B^2$ are the armature or induced windings of the alternator.

C—C—C—C are collecting rings for supplying currents from the exciter to the windings $A'$ $A^2$ of the revolving field structure.

D is the main energizing winding of the exciter, preferably of the distributed type.

E is the induced winding of the rotating armature preferably of the distributed type, and connected with a commutator $E'$ on which rest the brushes F G H I. These brushes are connected to the stator winding D of the exciter at points $f$ $g$ $h$ $i$, the connections being such that the stator winding D is dissymmetrical relatively to the points of connection of the taps of the winding of the armature E connected to the brushes. In the connections between the brushes F G H I and the points $f$ $g$ $h$ $i$ on the stator are inserted resistances R and inductances S between which are connected conductors T leading to the several collecting rings C—C—C—C. The resistances are in the stator circuit or between the conductors T and the stator windings, while the inductances are in the rotor circuit or between the conductors T and the brushes. In series with one of each said pairs of conductors respectively are compensating coils or windings J and K, through all of which flow currents supplied to the exciting circuits of the alternator.

The elements for one phase are shown more diagrammatically in Fig. 2, the same reference letters being used.

The compensating coils J and K are so positioned as to superimpose upon the field made by the winding D an additional field due to the current supplied to the exciting circuits of the alternator. This additional field is in each instance at right angles to the brushes from whence flow the currents producing it, and when that current is of unity power factor acts to increase the total magnetization of the exciter and its electro-motive force. When, on the other hand, the exciter receives power factor unity currents from the alternator, as is the case under certain conditions, the magnetization of the exciter and its potential will be reduced by increase of such current. In an exciter so constructed, the electro-motive force of the machine rises when it is delivering an increasing lagging current to the external circuit, and also rises when delivering increasing power factor unity currents, such as the "superimposed" currents before described, and falls when receiving power factor unity currents, that is, currents which differ in phase from the exciter electro-motive forces by 180°, and therefore flow through the exciter against such electro-motive force. These potential characteristics of the exciter are readily obtained within wide limits by adjusting once for all the resistances of the stator circuit of the exciter and the inductance of its rotor circuit, and by supplying to the exciter suitable compounding coils J and K. The inductances S or the compounding coils J and K may both be used as shown in the diagram, or if desired, either of them may be omitted, the other being proportioned accordingly.

I may briefly illustrate the reactions by reference to the particular form shown in Fig. 1, when for example, the rotation of the machine is counter-clockwise, and the frequency generated by the alternator is equal to the difference of the rotational and excitation frequencies. Assume that the machine be magnetized by a given and required potential and that suddenly the alternator be called upon to deliver a load current at power factor unity, such a current flowing from the stator windings of the alternator will produce an additional flux in the air gap of the alternator through which the rotor conductors of this machine pass from rear to front. They will evidently have generated in them an electromotive force of the same frequency as that of the exciting circuit and they will consequently urge a superimposed current through the rotor circuit, of the alternator and rotor circuit of the exciter and this current will lag very nearly 90° behind the electro-motive force urging it, for the reason that the resistance of the rotor circuit is preferably of very small value, as described in the patents above referred to. Such lag of the superimposed current causes it to nearly but not quite oppose the stator current of the alternator, consequently a resultant magnetization or armature reaction of very small value assisting or coöperating with the original magnetization of the machine will be produced. Such increase of magnetization will evidently increase the electro-motive force of the alternator, as indicated in Fig. 4ª (P. F. 1.), unless its production is accompanied by a corresponding or complementary decrease in the electromotive force of the exciter and consequent decrease of the original magnetizing current, as indicated in Fig. 4 (P. F. 1.). The flow of the superimposed current through the compounding coils of the exciter will tend to decrease the flux of that machine, and consequently its electro-motive force, for the direction of such superimposed current will be opposite to the terminal electromotive force of the exciter. By properly choosing the values of the resistance in the field circuit and the number of turns in the compounding coil of the exciter, the potential of the exciter may be made to automatically decrease in approximately the same proportional value as the electro-motive force of the alternator tends to increase when delivering the currents above mentioned, with the result of maintaining the terminal potential of the alternator constant through variations of load. The reaction of the current upon the inductances results in a decreasing magnetizing current in the main energizing windings of the exciter. The inductances may therefore be used to supplement the action of the compounding coil. In the same way, it may be shown that if the alternator be called upon to deliver lagging currents to the external circuit, which with constant potential excitation would cause drops such as indicated at Fig. 4ª (P. F. 5 and O), such lagging currents will be accompanied by superimposed lagging currents in the rotor and exciter circuit which in turn will automatically increase the potential of the exciter (see Fig. 4) through the reactions occurring in that machine, as described in the applications referred to.

It will thus be seen that the system contemplates the control of the terminal potential of the alternator by variations in the potential of the exciter, brought about by currents in the exciting circuit produced in turn by variations of the load of the machine.

When the alternator runs either clockwise or counter-clockwise, and delivers lagging currents to the external circuit, the superimposed current in the rotor circuit is nearly 180° in phase from such lagging current and so substantially in phase with the magnetizing current in the rotor circuit.

When the alternator runs clockwise and the frequency is the sum of the two frequencies and delivers power factor unity current to the external circuit, the superimposed current in the rotor circuit is approximately in phase with the exciter electromotive force, but when the alternator runs counter-clockwise and the effective frequency is the difference of the two frequencies and it delivers power factor unity currents to the external circuit, the superimposed current in the rotor circuit is substantially 180° from the exciter electro-motive force, that is to say, is nearly opposite to it. When the superimposed current is substantially in phase with the exciter electro-motive force, the exciter potential is automatically raised by the compounding coil (see Fig. 3), thus compensating for the tendency to fall of the alternator electromotive force that would otherwise take place (Fig. 3ª).

When the alternator runs counter-clockwise in delivering power factor unity currents to the external circuit, the superimposed current in the rotor circuit flows through the exciter against the exciter electro-motive force, and consequently in a reverse direction around the compounding coil and thus decreases the electro-motive force of the exciter compensating for the increase of alternator electro-motive force that would otherwise take place.

What I claim is:—

1. In a system for generating and distributing alternating currents, the combination of an alternator excited by alternating currents, a separately energized exciter for supplying said currents, the potential gradient of said exciter being complementary to the normal potential gradient of the alternator.

2. In a system for generating and distributing alternating currents, the combination of an alternator excited by low frequency alternating currents, a separately energized exciter for supplying such low frequency currents, said low frequency exciter having a potential gradient counteracting the tendency of said alternator to vary its electromotive force with changes of load or power factor.

3. In a system for generating and distributing alternating currents, the combination of an alternator excited by multiphase low frequency currents, a low frequency separately energized exciter for supplying said currents, said low frequency exciter having a potential gradient such as to counteract the tendency of said alternator to change its potential with load or power factor.

4. In a system for generating and distributing alternating currents, the combination of an alternator excited by alternating currents, a separately energized exciter therefor, supplying said currents to said alternator, said exciter being itself excited by alternating currents and having a potential gradient such as to counteract any tendency of said alternator to vary its potential by varying loads.

5. In a system for generating and distributing alternating currents, the combination of a multiphase alternator excited by multiphase currents, a separately energized multiphase exciter for supplying said currents, said exciter having a positive potential gradient.

6. In a system for generating and distributing alternating currents the combination of an alternator excited by multiphase currents, a separately energized exciter for supplying said currents, said exciter being itself excited by multiphase alternating currents, and means for compounding said exciter so that its potential shall be varied by the currents supplied by it to the alternator.

7. In a system for generating and distributing alternating currents, the combination of an alternator excited by alternating currents, an exciter for supplying said currents, said exciter having a stator winding and a rotor winding, a commutator connected to said rotor winding, commutator brushes bearing upon said commutator, and connected to said stator winding, the conductors leading to said alternator winding being connected between said rotor and stator circuits, and resistances in said stator circuits.

8. In a system for generating and distributing alternating currents, the combination of an alternator excited by alternating currents, an exciter for supplying said currents, said exciter having a stator winding and a rotor winding, a commutator connected to said stator winding, commutator brushes bearing on said commutator and connected to said stator winding, the conductors leading to said alternator winding being connected between said rotor and stator circuits, and inductances in said rotor circuits.

9. In a system for generating and distributing alternating currents, the combination of an alternator excited by alternating currents, an exciter for supplying said currents, said exciter having a stator winding and a rotor winding, a commutator connected to said stator winding, brushes bearing on said commutator and connected to said stator winding, the conductors leading to said alternator winding being connected between said rotor and stator circuits, resistances in said stator circuits, and inductances in said rotor circuits.

10. In a system for generating and distributing alternating currents, the combination of an alternator excited by alternating currents, an exciter supplying said alternating currents, said exciter having stator circuits and rotor circuits, a commutator connected to said rotor circuits, brushes bearing upon said commutator, connections between said brushes and said stator circuit, the conductors leading to the energizing windings of said rotor being connected to said connections, and compounding coils in series with said conductors.

11. In a system for generating and distributing alternating currents, the combination of an alternator excited by alternating currents, an exciter therefor, for supplying said currents, said exciter having a stator winding and a rotor winding, a commutator connected to said rotor winding, brushes bearing upon said commutator, connections between said brushes and said stator winding, conductors leading from said connections to the energizing winding of said alternator, compounding coils in series with said conductors, resistances in said connections between said conductors and said stator winding, and inductances in said connections between said conductors and said brushes.

WILLIAM STANLEY.

Witnesses:
HERBERT M. SMITH,
E. FACCIOLY.